United States Patent
Cook et al.

(10) Patent No.: US 6,792,028 B2
(45) Date of Patent: Sep. 14, 2004

(54) METHOD AND LASER BEAM DIRECTING SYSTEM WITH ROTATABLE DIFFRACTION GRATINGS

(75) Inventors: Lacy G. Cook, El Segundo, CA (US); Roger J. Withrington, Los Angeles, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/104,421

(22) Filed: Mar. 22, 2002

(65) Prior Publication Data

US 2003/0179804 A1 Sep. 25, 2003

(51) Int. Cl.[7] ................................................. H01S 3/08
(52) U.S. Cl. ....................... 372/102; 372/98; 372/99; 372/100; 372/101; 372/103
(58) Field of Search ..................... 372/98–103; 359/17, 359/18, 197

(56) References Cited

U.S. PATENT DOCUMENTS

| 3,721,486 A | * | 3/1973 | Bramley ..................... 359/201 |
| 3,753,148 A | * | 8/1973 | Billman ..................... 331/94.5 |
| 5,126,869 A | * | 6/1992 | Lipchak et al. ................ 359/94 |
| 5,253,033 A | * | 10/1993 | Lipchak et al. ................. 356/5 |
| 5,349,591 A | * | 9/1994 | Weston et al. ................. 372/25 |
| 5,471,326 A | * | 11/1995 | Hall et al. ..................... 359/15 |
| 5,825,523 A |   | 10/1998 | Amitai |
| 6,292,278 B1 |   | 9/2001 | Lee et al. |
| 6,552,321 B1 | * | 4/2003 | Mills ....................... 250/208.1 |

* cited by examiner

Primary Examiner—Don Wong
Assistant Examiner—Leith Al-Nazer
(74) Attorney, Agent, or Firm—John E. Gunther; Leonard A. Alkov; William C. Schubert (57) ABSTRACT

A laser beam pointing and positioning system includes first and second rotatable diffraction gratings. Each grating deviates a laser beam by a predetermined angle of deviation. The relative rotational position of the gratings is controlled to change the beam steering angle and direction of a laser beam. A maximum beam steering angle of twice the angle of deviation may be achieved in any direction. The diffraction gratings may be etched on transmissive substrates of optical glass, sapphire, silicon (Si), Zinc Selenide (ZnSe), Zinc Sulfide (ZnS), or Germanium (Ge). The substrates may be positioned within rotary elements coupled respectively to electromechanical positional control elements to rotate the gratings.

29 Claims, 6 Drawing Sheets

METHOD AND LASER BEAM DIRECTING SYSTEM WITH ROTATABLE DIFFRACTION GRATINGS

TECHNICAL FIELD

The present invention pertains to optical systems, and in one embodiment, to laser beam positioning and pointing

BACKGROUND

In many applications, it is desirable to direct a laser beam over a very large field of regard, and once having reached some designated angle within the field of regard, to generate a small scan or raster pattern for the purpose of finding a target of interest. Laser beam pointing and positioning has been conventionally accomplished with either pointing mirrors, scan wheels, counter rotating wedges and/or various two-axis gimbal arrangements. These conventional mechanisms are mechanically complex, costly, require significant power for operation and are large in size. The mechanical complexity of these conventional mechanisms also makes them less reliable. Furthermore, many of these conventional laser beam pointing and positioning mechanisms are limited either in the range of angles that can be covered or in the amount of time needed to reach a designated position in the field. In the case of gimbals, for example, the gimbal set is typically displaced from a vehicle's surface requiring a very large sensor window. Furthermore, prism apex angles and prism thickness can become very large for large steering angles.

Thus there is general need for improved laser beam pointing and laser beam positioning methods and systems. There is also a need for a system and method suitable for steering a laser beam over large angles in two-dimensions. There is also a need for a laser beam pointing and positioning system and method that is less complex. There is also a need for a laser beam pointing and positioning system and method that requires less hardware. There is also a need for a laser beam pointing and positioning system and method that is less costly. There is also a need for a laser beam pointing and positioning system and method that requires less power for operation. There is also a need for a laser beam pointing and positioning system and method that is more reliable. There is also a need for a laser beam pointing and positioning system and method that is smaller in size.

BRIEF DESCRIPTION OF THE DRAWINGS

The appended claims point out different embodiments of the invention with particularity. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

In one embodiment, the present invention provides a laser beam pointing and positioning system. In another embodiment, the present invention provides a laser beam communication system. In another embodiment, the present invention provides a laser radar (LADAR) system. In another embodiment, the present invention provides a system for steering a laser beam. In another embodiment, the present invention provides a target tracking system. In another embodiment, the present invention provides a laser beam welder. In another embodiment, the present invention provides a laser beam cutter.

In accordance with one embodiment, a laser beam pointing and positioning system includes first and second rotatable diffraction gratings. Each grating deviates a laser beam by a predetermined angle of deviation. The relative rotational positions of the gratings are controlled to change the beam steering angle and direction of a laser beam. A maximum beam steering angle of twice the angle of deviation of any one grating may be achieved in any direction. The diffraction gratings may be etched on transmissive substrates and the substrates may be positioned within rotary elements coupled to electromechanical positional control elements to rotate the gratings. Large pointing angles may be generated with minimum swept volume.

Figure 1:
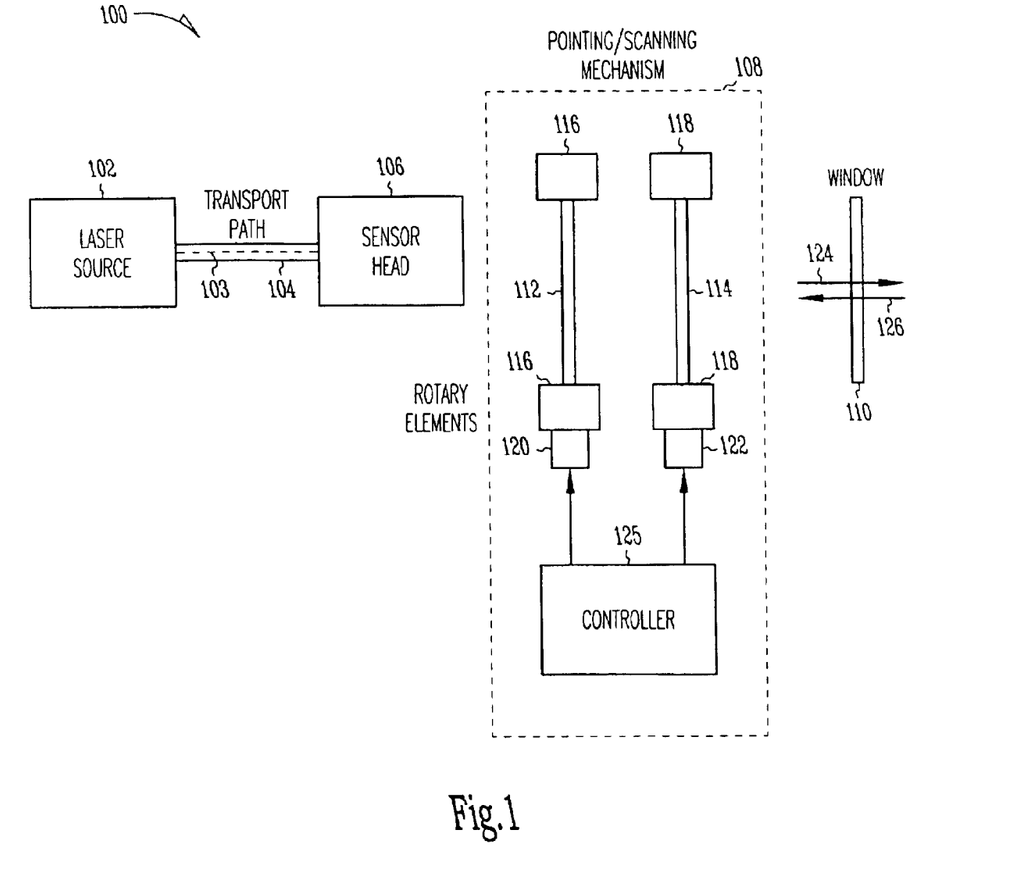
FIG. 1 is a functional block diagram of an optical system in accordance with an embodiment of the present invention.

FIG. 1 is a functional block diagram of an optical system in accordance with an embodiment of the present invention. System 100 includes laser source 102 to generate laser beam 103 and transport path 104 to transport the laser beam to sensor head 106. Sensor head 106, among other things, may expand the laser beam for pointing/scanning mechanism 108, which controls the direction and beam steering angle of the laser beam, which may be directed through window 110.

Laser source 102 generates laser beam 103 having a predetermined wavelength that may range, for example, from 0.5 microns to 10 microns. Laser source 102 may be a solid-state laser, a gas laser or a chemical laser. Transport path 104 provides for the propagation of laser beam 103 from source 102 to sensor head 106 and may provide for free-space propagation and/or guided wave propagation. In the case of guided wave propagation, transport path 104 may be comprised of waveguide or fiber optic elements. In addition to expansion of the laser beam, in one embodiment of the present invention (e.g., a LADAR embodiment), sensor head 106 may perform an aperture sharing function to allow for the separation of transmitted and received laser signals.

Mechanism 108 is comprised of rotatable diffraction gratings 112 and 114, rotary elements 116 and 118, electromechanical positional control elements 120 and 122 and controller 125. Rotatable diffraction gratings 112 and 114 are positioned within rotary elements 116 and 118. Rotary elements 116 and 118 allow for the rotation of diffraction gratings 112 and 114. Electro-mechanical positional control elements 120 and 122 rotate diffraction gratings 112 and 114 within rotary elements 116 and 118. Controller 125 generates control signals for control elements 120 and 122 to change a rotational position of diffraction gratings 112, and 114. The rotational position of diffraction gratings 112 and 114 affects the direction and beam steering angle of laser beam 124 through window 110. This is described in more detail below. Gratings 112 and 114 are illustrated in FIG. 1 as being parallel to each other; however this is not a requirement. In an alternate embodiment of the present invention, grating 114 may be tilted with respect to grating 112. Window 110 is an optional element of system 100 and may be comprised any material allowing for the transmission of a laser beam. Depending on the application platform, window 110 maybe curved or flat. For example, when system 100 is located in a nose of a missile, window 110 may be spherical. On the other hand, when system 100 is located on an aircraft, window 110 may be flatter. Window 110 should be large enough to accommodate a range of beam steering angles generated by mechanism 108.

System 100 may also be suitable as part of a laser beam positioning system, a laser beam pointing system or a laser beam steering system. In one embodiment, system 100 may be suitable for use in target tracking system. In these embodiments, a laser beam may be positioned on a target and may be used to designate and/or track a target. In these and in other embodiments, system 100 may be suitable for use in guided weapon applications.

In another embodiment, system 100 may be suitable for use as part of a laser beam communication system. In this embodiment, the laser beam may carry communication signals modulated thereon. System 100 may direct laser beam 124 to a receiver for reception and demodulation of the signals. In this embodiment, system 100 may also receive laser beam 126 having communication signals modulated thereon and direct such signals for demodulation through an aperture-sharing element of sensor head 106.

In yet another embodiment, system 100 is suitable for use as part of a laser radar (LADAR) system. In this embodiment, return signals 126 from laser beam signals 124 may be sampled from a target to determine ranging and/or distance information. The return signals may be received through gratings 114 and 112 in a manner similar to their transmission. The LADAR system, for example, may be used for terminal guidance and intercept purposes. In another embodiment, system 100 may be suitable for use as part of a laser beam welder or a laser beam cutter.

Figure 2:
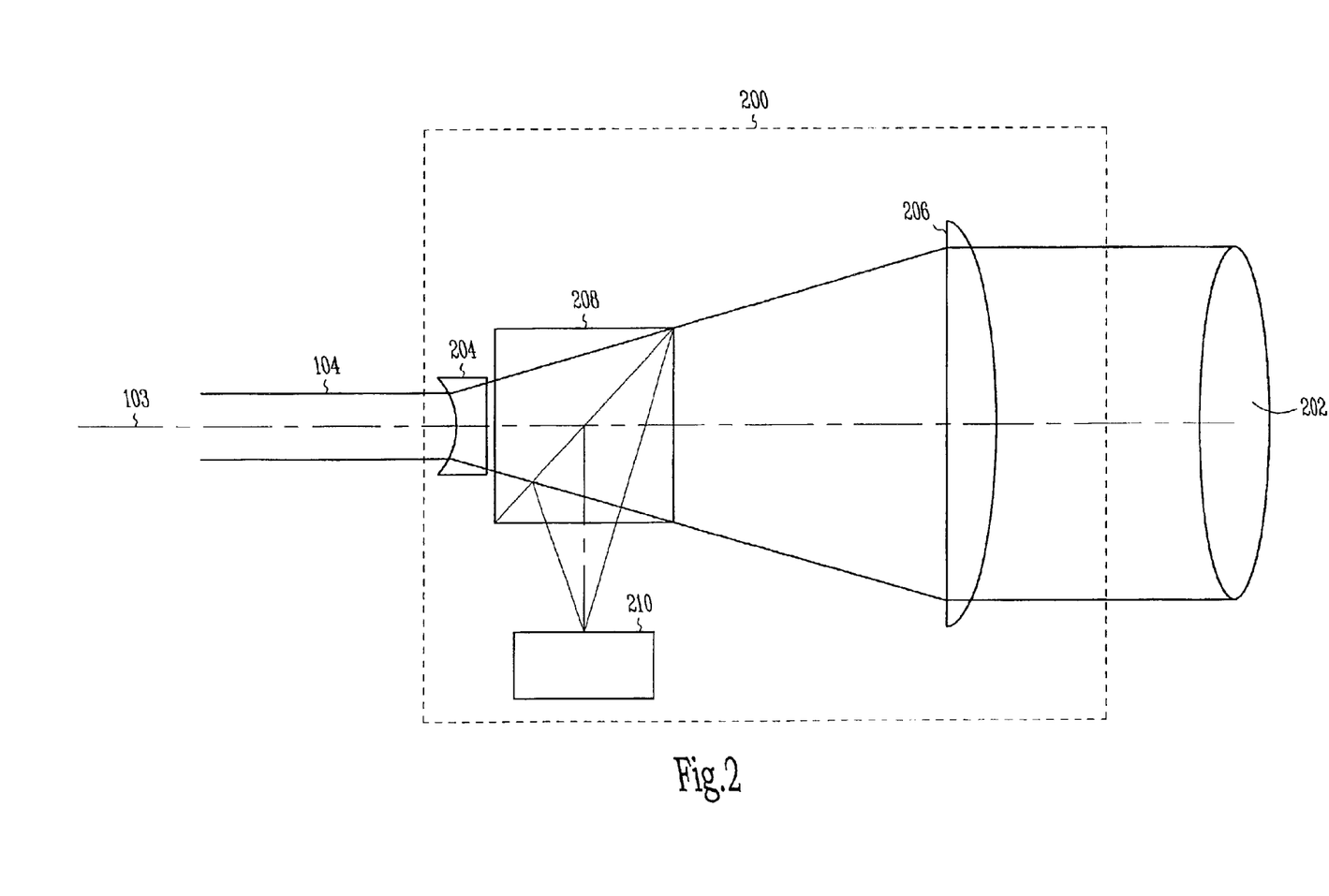
FIG. 2 is an example functional block diagram of a sensor head in accordance with an embodiment of the present invention.

FIG. 2 is a functional block diagram of a sensor head in accordance with an embodiment of the present invention. Sensor head 200 may be suitable for use as sensor head 106 (FIG. 1) although other sensor heads are also suitable. Sensor head 200 may receive laser beam 103 (FIG. 1) from transport path 104 (FIG. 1) and may generate expanded laser beam 202. Expanded laser beam 104 may have a circular cross-section. Sensor head 200 may include beam expansion element 204 to expand the beam to a cone and refocus element 206 to refocus the beam from the conical shape to, for example, a shape with a larger circular cross-section. Elements 204 and 206 may be optical lenses or mirrors. In one embodiment, the diameter of expanded laser beam 202 may approximate a diameter of diffraction grating 112. In one embodiment, sensor head 200 may include aperture-sharing element 208, which may separate received laser signals from transmitted laser signals. Aperture sharing element 208 directs a received laser signal to reception element 210. Aperture-sharing element 208 may, for example, implement a polarization technique to separate the transmitted from the received signals. Aperture-sharing element 208 may also include, for example, a mirror with a hole to separate received and transmitted laser signals. Although transport path 104 (FIG. 1) and the path of laser beam 103 through sensor head 200 is shown as a straight line, this is not a requirement. The path may include mirrors and other elements to allow for physical system requirements and to allow for a compact system design.

Figure 3:
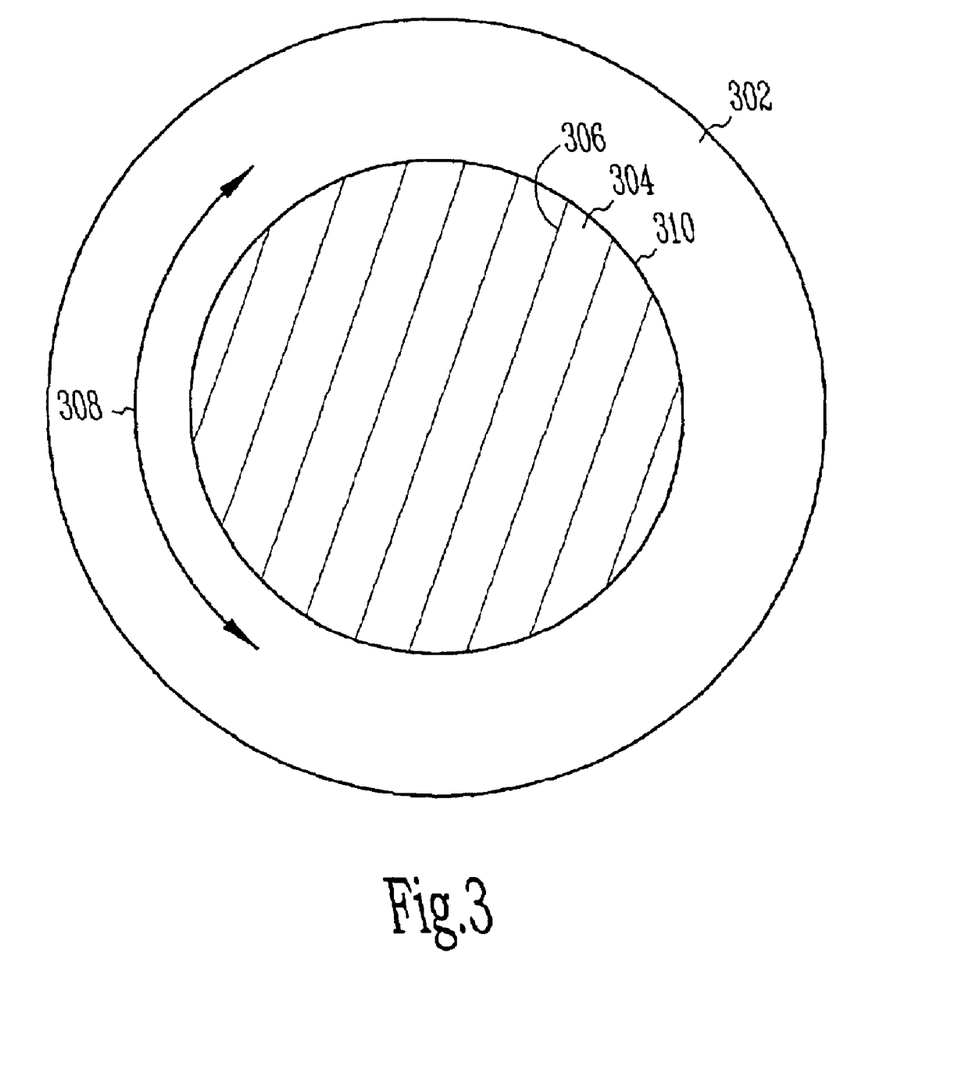
FIG. 3 illustrates an example of a diffraction grating located within a rotary element in accordance with an embodiment of the present invention.

FIG. 3 illustrates an example of a diffraction grating located within a rotary element in accordance with an embodiment of the present invention. In the example illustrated, diffraction grating 304 is located within rotary element 302 allowing for the rotation of diffraction grating 304. Diffraction grating 304 may be suitable for use as diffraction grating 112 and/or 114 (FIG. 1) although other diffraction gratings may also be suitable. A top or bottom view of diffraction grating 304 is illustrated in FIG. 3, while side views of diffraction gratings 112 and 114 are illustrated in FIG. 1. Rotary element 302 may be suitable for use as rotary element 116 and/or 118 (FIG. 1) although other rotary elements are also suitable. Rotary element 302 may be comprised, for example, of a ball bearing supported structure or bushing supported structure allowing the inside portion to rotate within the outside portion. The outside portion may be fixed and the inside portion may be rotated by an electromechanical element such as electromechanical positional control element 120 or 122 (FIG. 1). Electro-mechanical positional control element 120 or 122 (FIG. 1) may be an electric motor.

Diffraction grating 304 may be comprised of periodic linear grating structure 306 comprised of a plurality of parallel linear gratings having a spacing (e.g., grating period) that may be on the order of a wavelength of laser beam 103 (FIG. 1). The linear grating structure 306 may be etched or cut in transmissive substrate 310 that is generally thin and stiff. Examples of suitable substrates include optical glass, sapphire, silicon (Si), Zinc Selenide (ZnSe), Zinc Sulfide (ZnS) and Germanium (Ge). Substrate 310 may be substantially circular in shape although other shapes may be suitable. Grating 304 may be comprised of high-efficiency diffraction gratings operating in a transmission mode. Grating structure 306 is configured to deflect an incident laser beam a predetermined angle of deviation. For example, a laser beam incident on grating 304 (i.e., from above or below the page) may be deflected by thirty degrees as it passes through the substrate. The angle of deviation may range from as little as a couple of degrees to up to 40 degrees and even greater depending on the parameters of grating 304. For example, the following equation may be used to describe the relation between grating parameters:

$$n\lambda = d \sin \theta$$

In this equation, n is the diffraction order, $\lambda$ is the wavelength of the laser beam, d is the spacing of the grating structure and $\theta$ is the angle of deviation produced by the grating. Rotational position 308 of grating 304 determines the direction at which the laser beam is directed. The rotation of grating 304 around a full 360 degrees will sweep the laser beam in a cone at the angle of deviation.

In accordance with one embodiment of the present invention, sensor head 200 (FIG. 2) provides expanded laser beam 202 (FIG. 2) to diffraction grating 304. Expanded laser beam 202 (FIG. 2) may have a circular cross-section. Accordingly, diffraction grating 304 deflects the expanded laser beam the predetermined angle of deflection in a direction determined by the construction of the grating and by rotational position 308. The combination of two gratings 304, such as gratings 112 and 114 (FIG. 1) provide for a beam steering angle ranging from zero to the sum of the angles of deviation of each diffraction grating depending on the relative rotational positions of the two diffraction gratings. Grating structure 306 has a blaze angle, which may be determined for high efficiency providing for substantially the entire laser beam to be diverted in the direction of the angle of deviation.

In accordance with an embodiment, the diffraction gratings may replace refractive prisms used in conventional systems. The "power" of the grating (i.e., its ability to deviate light) is a function of the grating period as opposed to the prism refractive index, apex angle and thickness. Ray bending occurs in a single plane for a grating as opposed to the bulk behavior of the prisms. The transmissive substrate of the grating may be very thin and lightweight compared to an equivalent prism.

Figure 4A:
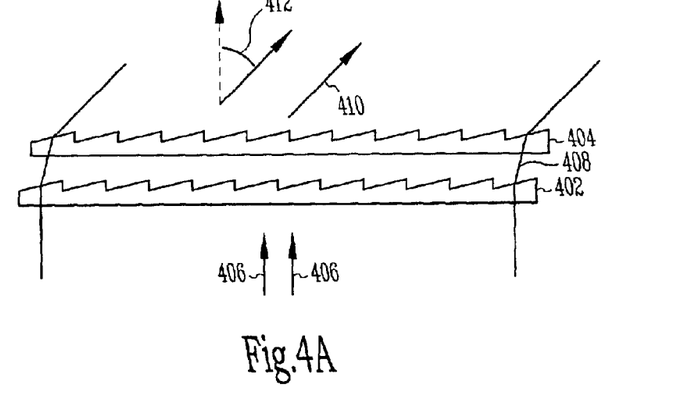
FIGS. 4A, 4B and 4C illustrate the operation of pairs of diffraction gratings in accordance with an embodiment of the present invention.
Figure 4B:
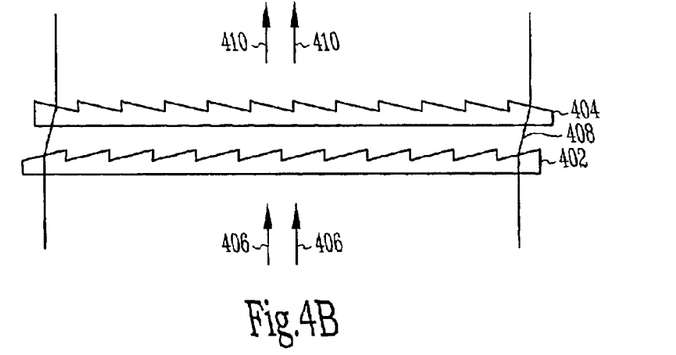
Figure 4C:
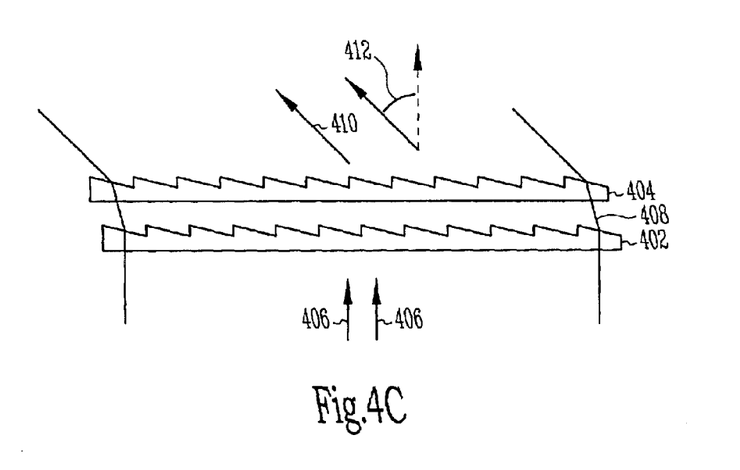

FIGS. 4A, 4B and 4C illustrate the operation of pairs of diffraction gratings in accordance with an embodiment of the present invention. First diffraction grating 402 may correspond with diffraction grating 112 (FIG. 1) and second diffraction grating 404 may correspond with diffraction grating 114 (FIG. 1). In FIG. 4A, grating 402 and grating 404 are rotationally positioned to provide a maximum beam steering angle. In this case, grating 402 deflects incident laser beam 406 by the grating's predetermined angle of deviation and grating 404 further deflects laser beam 408 by it's predetermined angle of deviation. Rather that being perpendicularly incident on grating 404, laser beam 408 arrives at grating 404 at an angle of deviation determined by diffraction grating 402. The angle of deviation may be defined as amount of angular deviation from the direction of incoming laser beam 406. In other words, in FIG. 4A, gratings 402 and 404 are rotated to a position where their angles of deviation are in the same direction providing laser beam 410 at maximum beam steering angle 412. In FIG. 4A, grating 404 is positioned at a relative rotational position of zero degrees with respect to grating 402.

In FIG. 4B, the relative rotational position of gratings 402 and 404 are changed so that the amount of deviation from both gratings is canceled to provide laser beam 410 at a minimum beam steering angle. Grating 402 deflects incident laser beam 406 by the grating's predetermined angle of deviation and grating 404 deflects laser beam 408 by its predetermined angle of deviation. However in this case, the angle of deviation of grating 404 is in the opposite direction of the angle of deviation of grating 402. In FIG. 4B grating 404 is positioned at a relative rotational position 180 degrees with respect to grating 402.

In FIG. 4C, the relative rotational positions of gratings 402 and 404 are the same as in FIG. 4A, however both gratings are rotated together 180 degrees deviating laser beam 410 in a direction opposite that of FIG. 4A. As can be seen, the rotation of both gratings 402 and 404 together without changing their relative rotational position allows laser beam 410 to be directed in any direction around a cone. Changing the relative rotational position of the two gratings changes the beam steering angle. Accordingly, by the rotation of the diffraction gratings 402 and 404, a laser beam may be pointed in any direction and at any angle up to the sum of the predetermined angles of deviation of the two diffraction gratings.

Figure 5A:
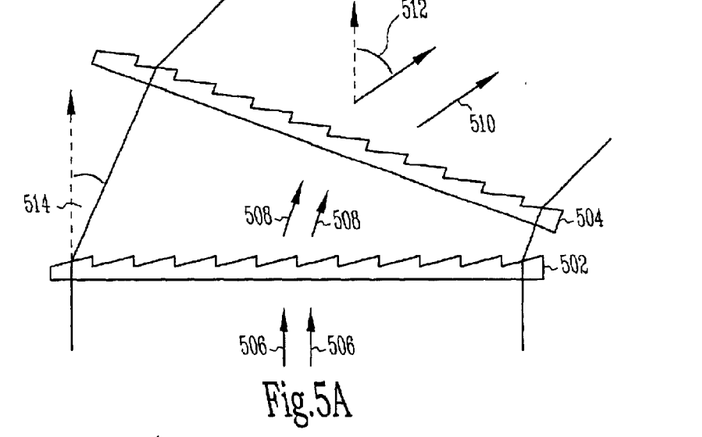
FIGS. 5A, 5B and 5C illustrate the operation of pairs of diffraction gratings in accordance with an alternate embodiment of the present invention.
Figure 5B:
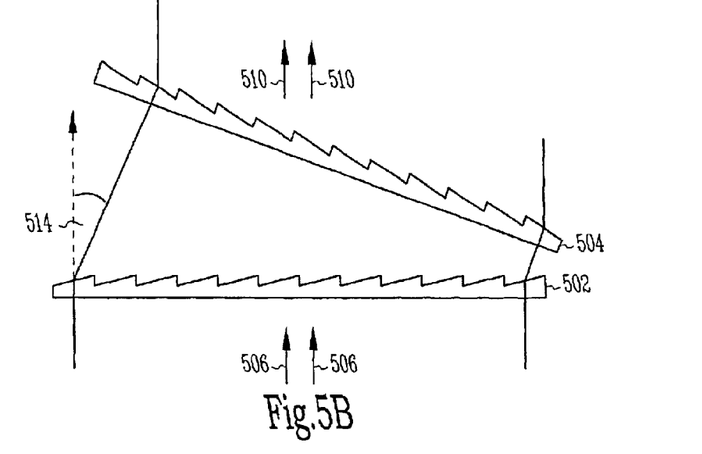
Figure 5C:
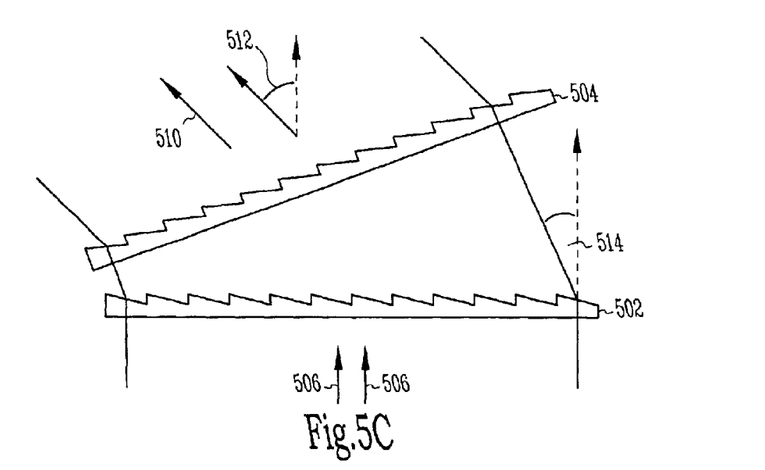

FIGS. 5A, 5B and 5C illustrate the operation of pairs of diffraction gratings in accordance with an alternate embodiment of the present invention. In this embodiment, first diffraction grating 502 may correspond with diffraction grating 112 (FIG. 1) and second diffraction grating 504 may correspond with diffraction grating 114 (FIG. 1). In this embodiment, second diffraction grating 504 is tilted at angle 514 with respect to first diffraction grating 502. Angle 514 may be a predetermined angle of deviation of first diffraction grating 502. This allows deflected laser beam 508 to be normally incident upon second diffraction grating 504 (e.g., at about 90 degrees). In this embodiment, the angle of tilt of grating 504 may remain fixed with respect to grating 502, however both gratings may rotate together such that laser beam 508 remains normally incident on grating 504. Although grating 114 (FIG. 1) is illustrated without tilt, grating 114 may be tilted in accordance with this alternate embodiment.

In FIG. 5A, grating 502 and grating 504 are rotationally positioned (i.e., rotated) to provide a maximum beam steering angle. In this case, grating 502 deflects incident laser beam 506 by the grating's predetermined angle of deviation and grating 504 deflects laser beam 508 by it's predetermined angle of deviation providing maximum beam steering angle 512. In FIG. 5A grating 504 is positioned at a relative rotational position of zero degrees with respect to grating 502.

In FIG. 5B, the relative rotational position of gratings 502 and 504 are changed so that the amount of deviation provided by grating 502 is canceled by the action of grating 504 to provide laser beam 510 at a minimum beam steering angle. Grating 502 deflects incident laser beam 506 by the grating's predetermined angle of deviation and grating 504 deflects laser beam 508 by its predetermined angle of deviation. However in this case, the angle of deviation of grating 504 is in the opposite direction of the angle of deviation of grating 502. In FIG. 5B grating 504 is positioned at a relative rotational position of 180 degrees with respect to grating 502.

In FIG. 5C, the relative rotational positions of gratings 502 and 504 are the same as in FIG. 5A, however both gratings are rotated together 180 degrees illustrating laser beam 510 in a direction opposite that of FIG. 5A. As can be seen, both gratings 502 and 504 are rotated without changing their relative rotational position allowing laser beam 510 to be directed in any direction around a cone. Changing the relative rotational position of the two gratings changes the beam steering angle. Accordingly, by the rotation of the diffraction gratings 502 and 504 together and separately, a laser beam may be pointed in any direction and at any angle up to the sum of the predetermined angles of deviation of the two diffraction gratings.

Figure 6:
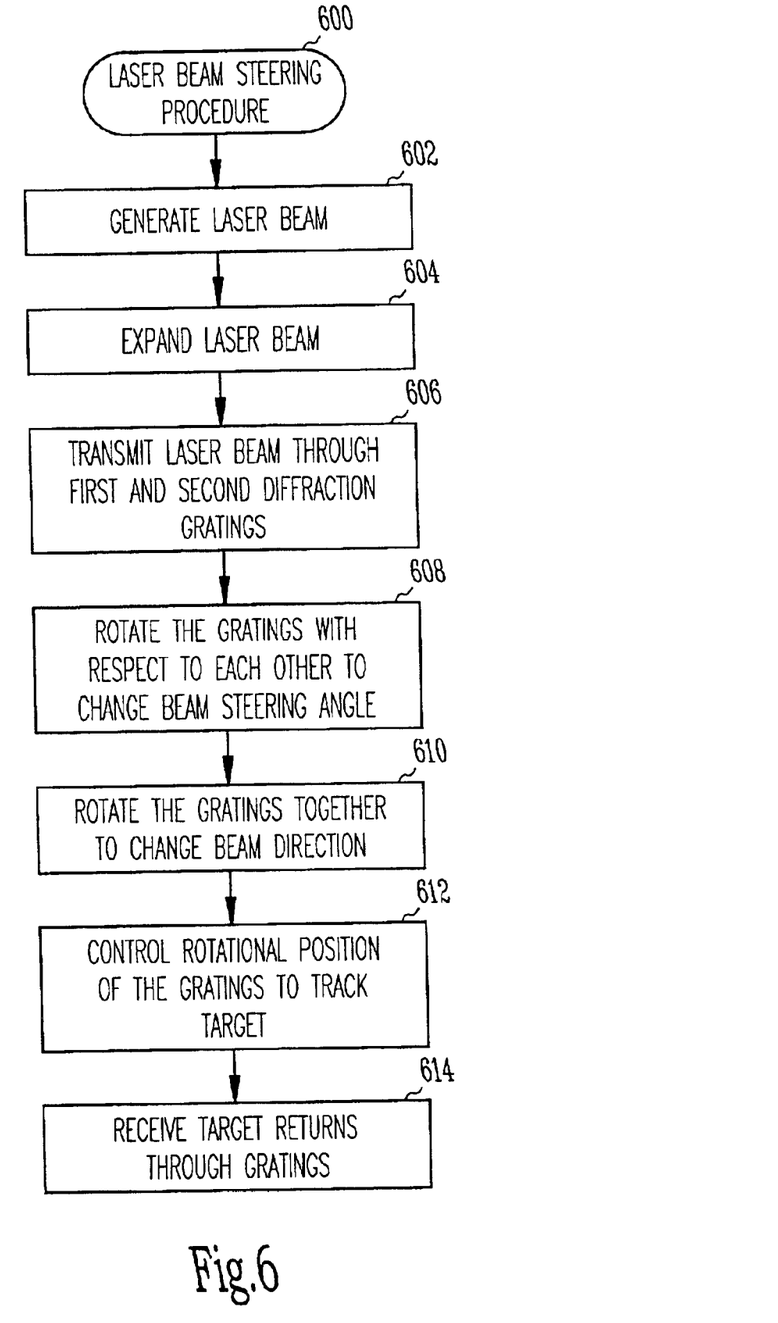
FIG. 6 is a flow chart of a laser beam steering procedure in accordance with an embodiment of the present invention.

FIG. 6 is a flow chart of a laser beam steering procedure in accordance with an embodiment of the present invention. Procedure 600 may be implemented by system 100 (FIG. 1), although other systems are also suitable. Procedure 600 may be used, for example, to position a laser beam, to point a laser beam or to steer a laser beam. Procedure 600 may also be implemented as part of a target tracking system. Procedure 600 may also be suitable for use as part of a laser beam communication system. Procedure 600 is also suitable for use as part of a laser radar (LADAR) system. Procedure 600 may also be suitable for use as part of a laser beam welder or a laser beam cutter. Although the individual operations of procedure 600 are illustrated and described as separate operations, one or more of the individual operations may be performed concurrently and nothing requires that the operations be performed in the order illustrated.

Operation 602 generates a laser beam. In operation 604, the laser beam is expanded to a larger diameter. In operation

606, the laser beam is transmitted through first and second diffraction gratings. The laser beam is deviated by an angle of deviation by each of the diffraction gratings. Operation 608 rotates the first and second diffraction gratings with respect to each other to change a relative rotational position therebetween. The relative rotational position determines a beam steering angle of the laser beam. Operation 610 rotates the first and second diffraction grating together to change a direction of the laser beam. In one embodiment, operations 608 and 610 may rotate the first and second diffraction gratings with respect to each other in a plane substantially perpendicular to incidence of the laser beam on the first diffraction grating. In this embodiment, both diffraction gratings may be parallel to each other. In another embodiment, the second diffraction may be tilted with respect to the first diffraction grating. The angle of tilt may be approximately the angle of deviation of the first diffraction grating so that the laser beam deflected from the first grating is substantially normally incident upon the second grating regardless of the relative rotational positions of both diffraction gratings.

In one embodiment, operation 612 is performed. Operation 612 controls the relative rotational position between the first and second diffraction gratings to track a target. The laser beam may designate the target for a laser beam guided weapon. Operation 612 may also control the relative rotational position between the first and second diffraction gratings to position, point and/or steer a laser beam.

In one embodiment, operation 614 is performed. Operation 614 samples laser beam returns from a target to determine ranging information. In this embodiment, the laser signal returns may be received through the first and second diffraction gratings. The laser returns are deflected the predetermined angle of deviation by each diffraction grating. As part of operation 614, an aperture-sharing element may separate received and transmitted laser signals.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and broad scope of the appended claims.

What is claimed is:

1. A system for positioning an expanded laser beam comprising:
    a first blazed diffraction grating disposed on a first planar transmissive substrate to deflect the laser beam by a first predetermined angle of deviation;
    a second blazed diffraction grating disposed on a second planar transmissive substrate to receive the deflected laser beam from the first substrate and to further deflect the laser beam by a second predetermined angle of deviation; and
    first and second electro-mechanical positional control elements to independently circumferentially rotate respectively, both the first and second substrates within their planes to change their relative circumferential rotational position based on signals from a controller to provide a beam steering angle.

2. The system of claim 1, wherein the first and second substrates are substantially circular and are both independently circumferentially rotated about their center axis respectively by the first and second electro-mechanical positional control elements, and
    wherein the expanded laser beam substantially covers the first blazed diffraction grating.

3. The system of claim 2 wherein the beam steering angle ranges approximately from zero to the sum of the first and second predetermined angles of deviation,
    wherein a first angle of incidence of the laser beam on the first substrate remains substantially the same as the first substrate is rotated circumferentially within its plane, and
    wherein a second angle of incidence of the deflected laser beam on the second substrate remains substantially the same as the second substrate is rotated circumferentially with its plane.

4. The system of claim 3 wherein the first and second blazed diffraction gratings are fixed in a substantially parallel position with respect to each other, and
    wherein the first angle of incidence is substantially perpendicular to the first substrate, and the second angle of incidence on the second substrate is substantially equal to the first predetermined angle of deviation.

5. The system of claim 3 wherein the second blazed diffraction grating is tilted at an angle with respect to the first blazed diffraction grating, the angle being approximately the first angle of deviation, and
    wherein the first angle of incidence is substantially perpendicular to the first substrate and the second angle of incidence on the second substrate is substantially perpendicular to the second substrate.

6. The system of claim 1 wherein the first and second blazed diffraction gratings comprise a parallel series of grooves etched respectively into the first and second planar transmissive substrates.

7. The system of claim 6 wherein the first and second planar transmissive substrates pass the laser beam therethrough and are comprised of either optical glass, sapphire, silicon (Si), Zinc Selenide (ZnSe), Zinc Sulfide (ZnS), or Germanium (Ge).

8. The system of claim 6 further comprising:
    first and second circumferential-rotary elements having the first and second substrates respectively attached thereto, and
    wherein the first and second electro-mechanical positional control elements are coupled respectively to the first and second rotary elements, the first and second electro-mechanical positional control elements to respectively independently circumferentially rotate the first and second diffraction gratings changing their relative circumferential position within their respective planes.

9. The system of claim 8 wherein the controller generates control signals for the first and second electro-mechanical positional control elements to change the relative circumferential position to control the beam steering angle of the laser beam, and
    wherein the first and second electro-mechanical positional control elements comprise motors, and the first and second rotary elements comprise either bushings or bearings.

10. The system of claim 9 wherein the control signals from the controller further control the first and second electro-mechanical positional control elements to change a direction of the laser beam by circumferentially rotating one or both the first and the second blazed diffraction gratings.

11. The system of claim 1 further comprising:
a sensor head comprising a beam expansion element to expand the laser beam to a conical shape; and
a collimating element to collimate the beam from the conical shape to a cylindrical shape prior to incidence on the first blazed diffraction grating to substantially cover the first blazed diffraction grating.

12. The system of claim 11 wherein the sensor head further includes an aperture-sharing element to allow for separation of transmitted and received laser signals, and
wherein the beam expansion element and collimating element comprise optical lenses.

13. The system of claim 1 where the first and second blazed diffracting gratings have a grating period selected to achieve, respectively, the first and second predetermined angles of deviation.

14. A laser radar (LADAR) system comprising:
a laser beam-generating source to generate a laser beam;
a sensor head to allow for transmission and reception of the laser beam through aperture sharing; and
a scanning mechanism to control a beam steering angle and a direction of the laser beam, the scanning mechanism comprising:
a first blazed diffraction grating disposed on a first planar transmissive substrate to deflect an expanded version of the laser beam by a first predetermined angle of deviation;
a second blazed diffraction grating disposed on a second planar transmissive substrate to receive the deflected laser beam from the first substrate and to further deflect the laser beam by a second predetermined angle of deviation; and
first and second electro-mechanical positional control elements to circumferentially rotate respectively, both the first and second substrates within their planes to change their relative circumferential rotational position based on signals provided by a controllers
wherein the sensor head is located between the laser-beam generating source and the scanning mechanism.

15. The system of claim 14 wherein the sensor head expands the laser beam prior to incidence on the first diffraction grating, the sensor head comprising a beam expansion element to expand the laser beam to a conical shape, and wherein the sensor head further comprises a collimating element to collimate the conical-shaped beam to a cylindrical shape prior to incidence on the first blazed diffraction grating to substantially cover the first diffraction grating.

16. The system of claim 15 wherein the first and second blazed diffraction gratings respectively comprise a parallel series of grooves etched in the first and second transmissive substrates, and
the system further comprises first and second rotary elements having respectively the first and second substrates attached thereto, the first and second rotary elements comprising either bushings or bearings to allow circumferential rotation of the transmissive substrates.

17. The system of claim 16 wherein the first and second electro-mechanical positional control elements respectively independently circumferentially rotate the first and second blazed diffraction gratings changing their relative circumferential rotational position, and
wherein the first and second electro-mechanical positional control elements comprise motors.

18. The system of claim 17 wherein the second blazed diffraction grating is tilted at an angle with respect to the first blazed diffraction grating, the angle being approximately the first angle of deviation, and
wherein the first angle of incidence is substantially perpendicular to the first substrate and the second angle of incidence on the second substrate is substantially perpendicular to the second substrate.

19. The system of claim 17 wherein the controller generates control signals for the first and second electro-mechanical positional control elements to change the relative circumferential rotational position controlling the beam steering angle, and
wherein the control signals from the controller further control the first and second electro-mechanical positional control elements to change a direction of the laser beam by circumferentially rotating either one or both the first and the second planar transmissive substrates within their planes.

20. The system of claim 19 further comprising a return sampling element to sample laser beam returns received through the first and second transmissive substrates from a target to determine ranging information.

21. The system of claim 19 wherein the controller controls the relative circumferential rotational position between the first and second blazed diffraction gratings to track a target with the laser beam designating the target.

22. A method of positioning an expanded laser beam comprising:
passing the expanded laser beam serially through first and second planar transmissive substrates having respectively first and second blazed diffraction gratings disposed thereon, both the first and second blazed diffraction gratings being independently rotatable;
rotating the first and second planar transmissive substrates within their planes with respect to each other to change a relative circumferential rotational position therebetween, the relative circumferential rotational position determining a beam steering angle of the laser beam; and
circumferentially rotating the first and second blazed diffraction grating to change a direction of the laser beam.

23. The method of claim 22 further comprising expanding a laser beam to substantially cover the first blazed diffraction grating, and
wherein the blazed diffraction gratings comprise a series of parallel grooves etched into the planar transmissive substrates.

24. The method of claim 23 wherein rotating the first and second blazed diffraction gratings comprises circumferentially rotating the first and second blazed diffraction gratings in a plane substantially perpendicular to incidence of the laser beam on the first substrate and deflecting the laser beam by a predetermined angle of deviation.

25. The method of claim 24 further comprising sampling laser beam returns from a target using an aperture sharing element to determine ranging information.

26. The method of claim 25 wherein sampling laser beam returns comprises receiving laser beam returns through the first and second transmissive substrates, the laser beam returns being deflected by the predetermined angle of deviation by each blazed diffraction grating.

27. The method of claim 26 wherein sampling laser beam returns comprises receiving laser beam returns through the first and second transmissive substrates, wherein the second blazed diffraction grating is tilted at an angle with respect to the first blazed diffraction grating, the angle being approximately the first angle of deviation, and     wherein the first angle of incidence is substantially perpendicular to the first substrate and the second angle of incidence on the second substrate is substantially perpendicular to the second substrate.

28. The method of claim 26 further comprising collimating the expanded beam from substantially a conical shape to substantially a cylindrical shape prior to incidence on the first blazed diffraction grating.

29. The method of claim 24 further comprising controlling the relative circumferential rotational position between the first and second blazed diffraction gratings to track a target with the laser beam designating the target.

* * * * *